United States Patent
Stade et al.

(10) Patent No.: US 10,275,766 B2
(45) Date of Patent: Apr. 30, 2019

(54) ENCRYPTING FINANCIAL ACCOUNT NUMBERS SUCH THAT EVERY DECRYPTION ATTEMPT RESULTS IN VALID ACCOUNT NUMBERS

(71) Applicant: GOOGLE INC., Mountain View, CA (US)

(72) Inventors: Evan Andrew Stade, Los Angeles, CA (US); Matthew Morton Gaba, San Francisco, CA (US); Albert Scott Bodenhamer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 781 days.

(21) Appl. No.: 14/035,563

(22) Filed: Sep. 24, 2013

(65) Prior Publication Data
US 2016/0132869 A1  May 12, 2016

(51) Int. Cl.
*G06Q 40/00* (2012.01)
*G06Q 20/38* (2012.01)
*G06Q 20/40* (2012.01)

(52) U.S. Cl.
CPC ....... *G06Q 20/382* (2013.01); *G06Q 20/4018* (2013.01)

(58) Field of Classification Search
CPC .. G06Q 20/341; G06Q 20/3823; G06Q 20/40; G06Q 20/40975
See application file for complete search history.

(56) References Cited

U.S. PATENT DOCUMENTS

| | | | |
|---|---|---|---|
| 8,458,487 B1 | 6/2013 | Palgon et al. | |
| 2003/0120936 A1* | 6/2003 | Farris | G06F 21/83 713/189 |
| 2003/0225706 A1* | 12/2003 | Bookstaber | G06F 21/6254 705/64 |

(Continued)

OTHER PUBLICATIONS

Elefant, Steven (Secure online payment system requires end-to-end encryption, https://searchsecurity.techtarget.com/magazineContent/Secure-online-payment-system-requires-end-to-end-encryption. Sep. 2011) (Year: 2011).*

*Primary Examiner* — Bruce I Ebersman
*Assistant Examiner* — Mark H Gaw
(74) *Attorney, Agent, or Firm* — Johnson, Marcou & Isaacs, LLC

(57) ABSTRACT

A decryption module is enabled on one or more authorized devices. A user's financial account information is encrypted using a card verification number, or some secret known to the user and replicated onto the authorized devices. The user requests processing of a financial transaction using the previously-encrypted financial account information. The authorized device retrieves the encrypted financial account information and prompts the user to enter the card verification number (or other secret known to the user that was used to encrypt the financial account information). The decryption module decrypts the financial account information using the card verification number entered by the user, and the decrypted financial account information resembles a valid credit card or debit card number and will pass a Luhn test. The decrypted financial account information is transmitted to process the financial transaction initiated by the user.

16 Claims, 5 Drawing Sheets

(56) References Cited

U.S. PATENT DOCUMENTS

| | | | | |
|---|---|---|---|---|
| 2004/0054584 A1* | 3/2004 | Boon | ............... | G06Q 20/382 |
| | | | | 705/14.26 |
| 2007/0262138 A1* | 11/2007 | Somers | ............ | G06Q 20/341 |
| | | | | 235/380 |
| 2009/0144202 A1* | 6/2009 | Hurry | ............. | G06Q 20/085 |
| | | | | 705/67 |
| 2012/0324555 A1 | 12/2012 | Chambers et al. | | |

* cited by examiner

240

310
Decryption module on user device receives financial account information entered

320
Decryption module on user device encrypts financial information using card verification number

330
User device transmits encrypted financial account information and user account identification to account management system

340
Account management system receives encrypted financial account information and user account identification

350
Account management system identifies user account associated with encrypted financial account information and user account identification

360
Account management system saves encrypted financial account information in user account

370
Account management system transmits encrypted financial account information to each authorized user device

380
Authorized user devices receive encrypted financial account information

390
Authorized user devices save encrypted financial account information

ENCRYPTING FINANCIAL ACCOUNT NUMBERS SUCH THAT EVERY DECRYPTION ATTEMPT RESULTS IN VALID ACCOUNT NUMBERS

TECHNICAL FIELD

The present disclosure relates generally to a payment system, and more particularly to methods and systems that allow encryption and decryption of financial account numbers.

BACKGROUND

A user may store a financial account number in a computing device or digital wallet device for use during a payment transaction. Traditionally, the third party that stores store the financial account number is subject to payment card industry (PCI) compliance. PCI compliance imposes strict rules upon how a third party may store and retrieve a user's financial account number during a payment transaction. This strict compliance imposes a heavy cost for implementing a system.

Alternatively, a third party may store the financial account number as an opaque, encrypted BLOB for which the third party does not possess the encryption key. When an account number is stored in this manner, the third party falls outside of the scope of PCI compliance. The third party may provide the user with access to their financial account information by implementing a client-side decryption of the account number.

SUMMARY

In certain example aspects described herein, a method for encrypting and decrypting financial account numbers comprises an enabled decryption module on one or more authorized user devices. A user's financial account information is encrypted using a card verification number, or some other secret known to the user and replicated onto the authorized user devices. The user requests processing of a financial transaction using the previously-encrypted financial account information. The authorized user device retrieves the user's encrypted financial account information and prompts the user to enter the card verification number (or other secret known to the user that was used to encrypt the financial account information). The decryption module decrypts the financial account information using the card verification number entered by the user, and the decrypted financial account information resembles a valid credit card or debit card number and will pass a Luhn test. The decrypted financial account information is transmitted to process the financial transaction initiated by the user.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 3 is a block flow diagram depicting a method for encrypting financial account information and replicating the encrypted financial account information to all authorized user devices, in accordance with certain example embodiments.

DETAILED DESCRIPTION OF THE EXAMPLE EMBODIMENTS

Overview

Figure 1:
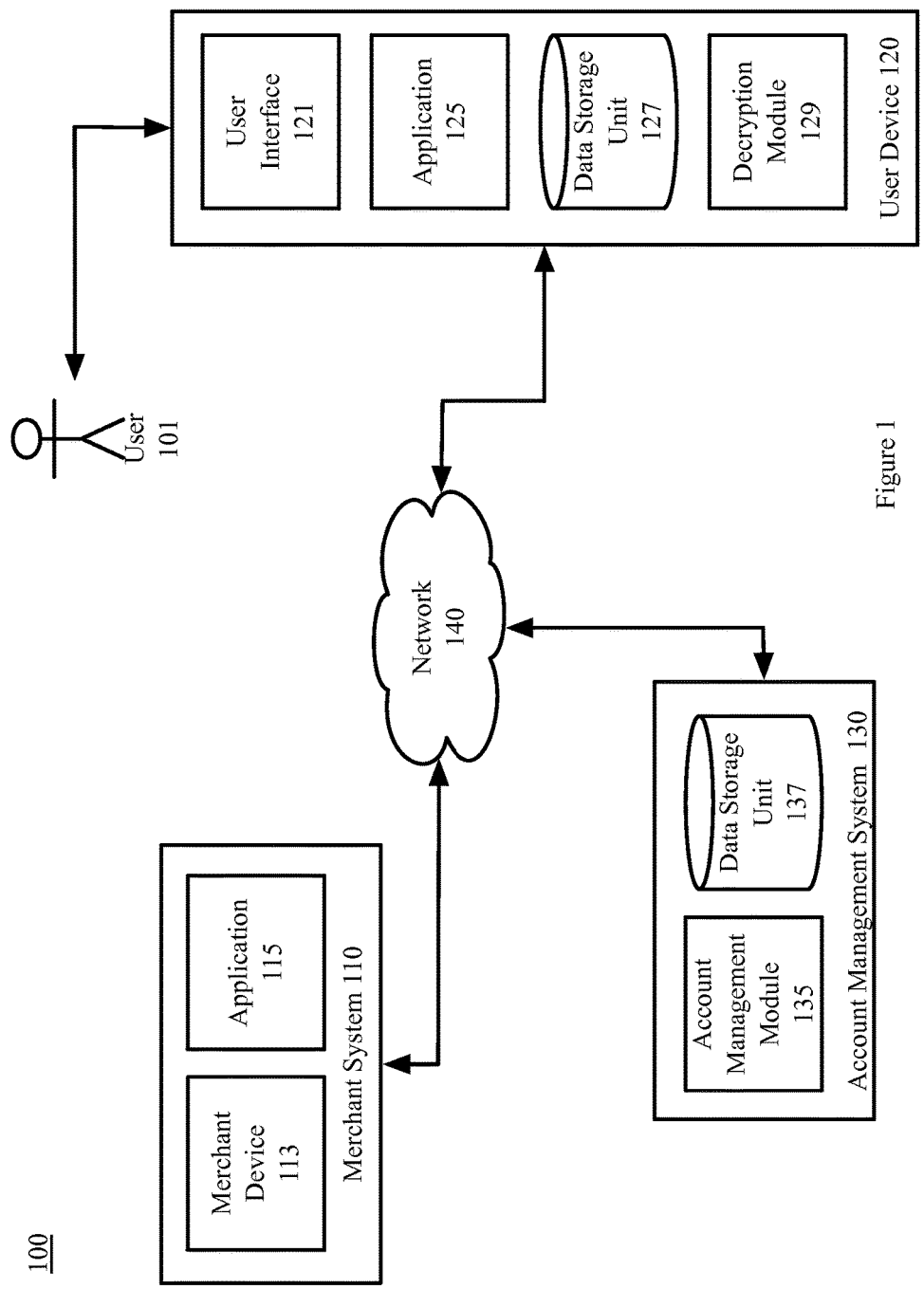
FIG. 1 is a block diagram depicting a financial account encryption system, in accordance with certain example embodiments.

The example embodiments described herein provide computer-implemented techniques for encrypting financial account numbers such that every decryption attempt results in valid account numbers. In an example embodiment, a decryption module encrypts a user's financial account information, and the encrypted financial account information is replicated to one or more authorized user devices. When the user desires to complete a financial transaction using the encrypted financial account information, the user enters a secret known only to the user, and the decryption module decrypts the financial account information, such that the decrypted financial account information resembles a valid financial account number. For example, the decryption module on the authorized user device uses the financial account's card verification number to encrypt and decrypt the corresponding financial account information. The card verification number is known only to the user and not saved to the user device. The decrypted financial account information resembles a valid credit card or debit card number and will pass a Luhn test. The user device, a merchant system that submits a payment request, and an account management system that maintains a user account comprising the encrypted financial account information do not know whether the decrypted financial account information is an actual credit or debit card number. These component systems only know that the decrypted account information will pass a Luhn test and thus, resemble a valid-looking card number.

A user enables a decryption module on one or more authorized user devices. The user is prompted to log into or create an account management system account. The user's account management system account becomes associated with the authorized user devices, such that the financial account information entered by the user is encrypted and replicated in encrypted form to each of the authorized user devices via the account management system account. In an example embodiment, the user's financial account information is encrypted using the card verification number, or some other secret known to the user. In this embodiment, the card verification number is not saved in the user's account management system account, nor is it replicated onto the authorized user devices.

The user requests processing of a financial transaction using the previously-encrypted financial account information. For example, the user accesses a shopping application on an authorized user device and requests to "check out" or otherwise pay for the products in the user's shopping basket. The authorized user device retrieves the user's encrypted financial account information and determines whether the user has more than one encrypted financial account. The authorized user device displays a listing of the financial accounts available (for example, by displaying the last 4 numbers of each account, displaying an account nickname, or displaying any form of account identifier). The user selects the financial account to process the transaction and the user device retrieves the corresponding encrypted financial account information.

The authorized user device prompts the user to enter the card verification number (or other secret known to the user that was used to encrypt the financial account information). The decryption module decrypts the financial account information using the card verification number entered by the user, and the decrypted financial account information resembles a valid credit card or debit card number and will pass a Luhn test. The decrypted financial account information is transmitted to the application, together with the card verification number, to process the financial transaction initiated by the user.

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting a financial account encryption system, in accordance with certain example embodiments. As depicted in FIG. 1, the exemplary operating environment 100 comprises a merchant system 110, a user device 120, and an account management system 130 that are configured to communicate with one another via one or more networks 140. In another example embodiment, two or more of these systems (including systems 110, 120, and 130) are integrated into the same system. In some embodiments, a user 101 associated with a device must install an application and/or make a feature selection to obtain the benefits of the techniques described herein.

Each network 140 includes a wired or wireless telecommunication means by which network systems (including systems 110, 120, and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, and 130) includes a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by merchants, users 101, and an account management system operator, respectively.

The merchant system 110 comprises at least merchant device 113 that is capable of processing a purchase transaction initiated by a user 101, for example, a cash register or point of sale (POS) terminal. In an example embodiment, the merchant operates a commercial store and the user 101 indicates a desire to make a purchase by communicating financial account information to the merchant device 113. In another example embodiment, the user device 120 is configured to perform the functions of the merchant device 113. In this example, the user 101 pays for the transaction via the user device 120 without interacting with the merchant device 113.

In an example embodiment, the merchant system 110 is capable of communicating with the user device 120 via an application 115. The application 115 may be an integrated part of the merchant device 113 or a standalone hardware device 115, in accordance with another example embodiment.

In an example embodiment, the merchant system 110 comprises a code scanner (not shown) or a reader (not shown) that is capable of communicating with a user device 120 and the merchant device 113 via the application 115. In an example embodiment, the code scanner (not shown) or reader (not shown) is capable of communicating with the user device 120 using an NFC communication method. In another example embodiment, the code scanner (not shown) or a reader (not shown) is capable of communicating with the user device 120 using a Bluetooth communication method. In yet another embodiment, the code code scanner (not shown) or a reader (not shown) is capable of communicating with the user device 120 using a Wi-Fi communication method. In another example embodiment, the user 101 scans a QR code or bar code or clicks a URL link on the user device 120, which temporarily associates the user device 120 to the online merchant system 110. The merchant device 113 queries the online merchant system 110 to link to the user 101 and/or user device 120. In an example embodiment, the code scanner (not shown) or a reader (not shown) may be configured to read any number of barcode formats, including without limitation, a QR code, a universal product code (UPC), a global trade item number (GTIN), a stock keeping unit (SKU), a Japanese article number (JAN), a world product code (WPC), an International Standard Book Number (ISBN), a European Article Number (EAN), etc. According to other example embodiments, code scanner 117 may be an electronic field generator with a CPU, a laser scanner, a charged-coupled device (CCD) reader, a camera-based reader, an omni-directional bar code scanner, a camera, a RFID reader, or any other device that is capable of reading product identifier information in a merchant system 110.

In an example embodiment, the user device 120 may be a personal computer, mobile device (for example, notebook computer, tablet computer, netbook computer, personal digital assistant (PDA), video game device, GPS locator device, cellular telephone, Smartphone or other mobile device), television, or other appropriate technology that includes or is coupled to a web server, or other suitable application for interacting with web page files. The user 101 can use the user device 120 to initiate the encryption of financial account information via a user interface 121 and an application 125. The application 125 is a program, function, routine, applet or similar entity that exists on and performs its operations on the user device 120. For example, the application 125 may be one or more of an encryption application, financial account application, shopping application, merchant system 110 application, an Internet browser, a digital wallet application, a loyalty card application, another value-added application, a user interface 121 application, or other suitable application operating on the user device 120. In some embodiments, the user 101 must install an application 125 and/or make a feature selection on the user device 120 to obtain the benefits of the techniques described herein. In an example embodiment, the user 101 uses the application 125 to requests processing of a financial transaction using the previously-encrypted financial account information via the user interface 121.

In an example embodiment, the data storage unit 127 can include any local or remote data storage structure accessible to the user device 120 suitable for storing information. In an example embodiment, the data storage unit 127 stores encrypted information, such as HTML5 local storage. In an example embodiment, the user device 120 retrieves the user's encrypted financial account information from the data storage unit 127 in response to the user's 101 request to process a financial transaction.

In an example embodiment, the application 125 determines whether the user 101 has more than one encrypted financial account and the user interface 121 displays a listing of the financial accounts available (for example, by displaying the last 4 numbers of each account, displaying an account nickname, or displaying any form of account identifier). In this embodiment, the user 101 selects the financial account to process the transaction and the user device 120 retrieves the corresponding encrypted financial account information.

An example user device 120 comprises a decryption module 129. In an example embodiment, the user device 120 prompts the user 101 to enter the card verification number (or other secret known to the user that was used to encrypt the financial account information). The decryption module 129 decrypts the financial account information using the card verification number entered by the user 101. In an example embodiment, the decrypted financial account information resembles a valid credit card or debit card number and will pass a Luhn test. In an example embodiment, the application 125 transmits the decrypted financial account information to the merchant system 110 application 115, together with the card verification number.

In another example embodiment, the data storage unit 127 and application 125 may be implemented in a secure element or other secure memory (not shown) on the user device 120. In another example embodiment, the data storage unit 127 may be a separate memory unit resident on the user device 120.

An example user device 120 communicates with the account management system 130. An example account management system 130 comprises an account management module 135 and a data storage unit 137. An example account management module 135 maintains an account for the user 101. In an example embodiment, the account comprises information for one or more encrypted financial accounts maintained by one or more financial institutions. In an example embodiment, the financial account information is saved in the data storage unit 137.

In an example embodiment, the data storage unit 137 can include any local or remote data storage structure accessible to the account management system 130 suitable for storing information. In an example embodiment, the data storage unit 137 stores encrypted information, such as HTML5 local storage.

The components of the example-operating environment 100 are described hereinafter with reference to the example methods illustrated in FIGS. 2-4. The example methods of FIGS. 2-4 may also be performed with other systems and in other environments.

Example System Processes

Figure 2:
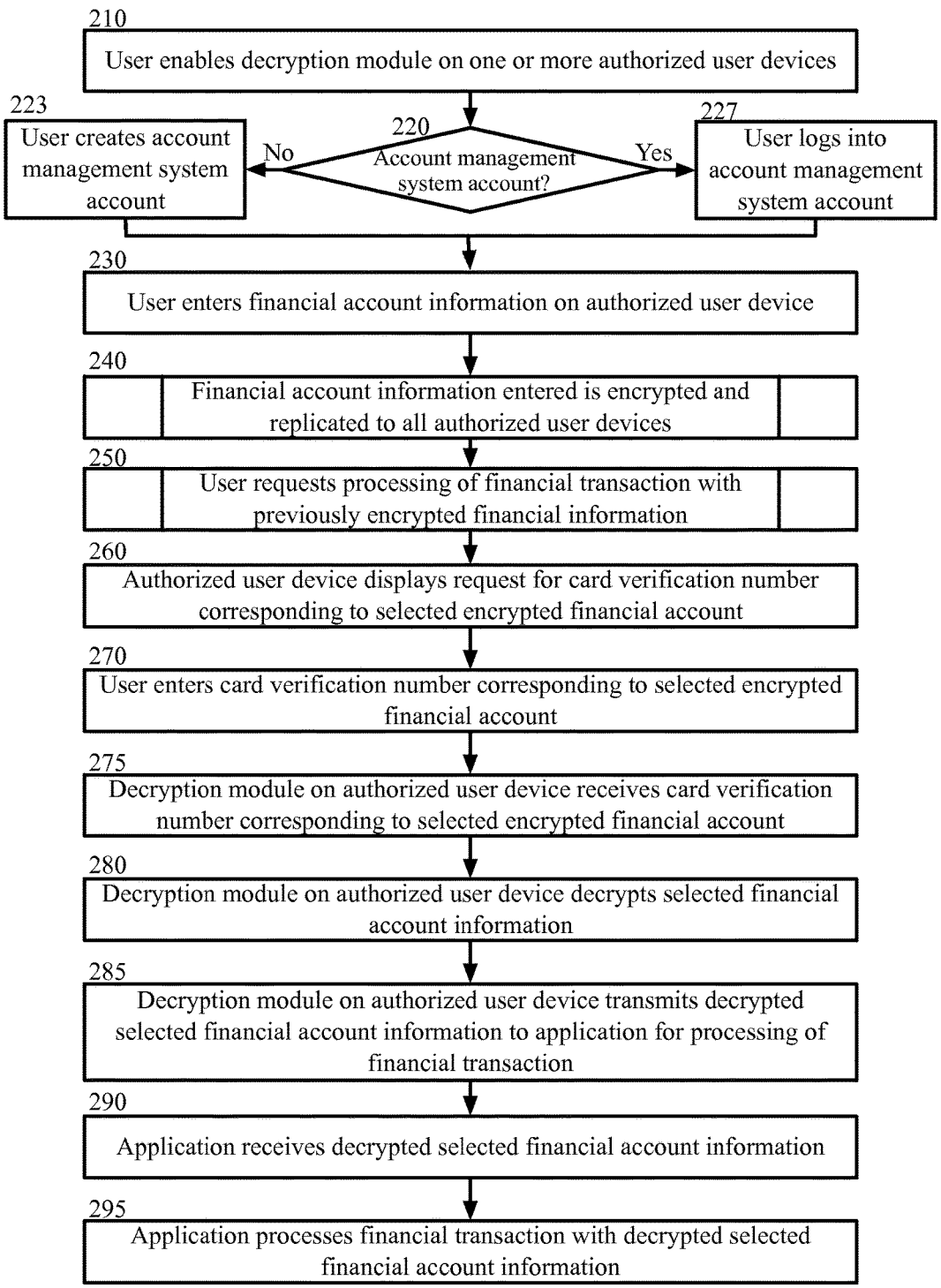
FIG. 2 is a block flow diagram depicting a method for encrypting and decrypting financial account numbers, in accordance with certain example embodiments.

FIG. 2 is a block flow diagram depicting a method for encrypting and decrypting financial account numbers, in accordance with certain example embodiments. The method 200 is described with reference to the components illustrated in FIG. 1.

In block 210, a user 101 enables a decryption module 129 on one or more user devices 120. In an example embodiment, once the user 101 enables the decryption module 129 on the user device 120 it becomes an "authorized" user device 120. In this embodiment, an authorized user device 120 receives encrypted financial account information and is capable of performing the methods described herein. The encrypted financial account information is replicated on each authorized user device 120 so that the user 101 can use any one or a number of authorized user devices 120 to perform the methods described herein. In another example embodiment, the user 101 can enable the decryption module 129 on an additional user device 120 at any time. Upon enabling the decryption module 129, the user device 120 becomes an authorized user device 120. In yet another example embodiment, the user 101 can disable the decryption module 129 at any time. In this embodiment, the user device 120 is not longer an authorized user device once the decryption module 129 is disabled. In an example embodiment, the encrypted financial account information is removed from the user device 120 once the decryption module 129 is disabled.

In block 220, the account management system 130 receives notification that the user 101 has enabled the decryption module 129 on the one or more user devices 120 and determines whether the user 101 has an account management system 130 account. In an example embodiment, the user 101 is prompted to log into or create an account management system 130 account when the decryption module 129 is enabled. In another example embodiment, the user 101 previously logged into the account management system 130 account and is otherwise automatically logged into the account. In yet another example embodiment, the user's 101 login credentials are shared across other accounts (for example, social networking websites and user device 120 accounts) and the user 101 is automatically logged into the account management system 130 account using the shared login credentials.

If the user 101 does not have an account management system 130 account, the method 200 proceeds to block 223 and the user 101 is prompted to create an account management system 130 account. In an example, the user 101 is prompted to register with the account management system 130 when the user 101 enables the decryption module 129. In another example embodiment, the user 101 is prompted to register with the account management system 130 when the user 101 downloads or enables an application 125. In yet another example embodiment, the user 101 is not required to log in or register for the account management system 130 account. In this embodiment, the methods described herein are performed for a "guest" user 101.

In situations in which the technology discussed here collects personal information about the user 101, or may make use of personal information, the user 101 may be provided with a opportunity to control whether programs or features collect user information (for example, information about the user's purchases, social network, social actions or activities, profession, a user's preferences, or a user's current location), or to control whether and/or how to receive content from the user device 120 and/or account management system 130 that may be more relevant to the user 101. In addition, certain data may be treated in one or more ways before it is stored or used, so that personally identifiable information is removed. For example, a user's identity may be treated so that no personally identifiable information can be determined for the user 101, or a user's geographic location may be generalized where location information is obtained (for example, to a city, ZIP code, or state level), so that a particular location of the user 101 cannot be determined. Thus, the user 101 may have control over how information is collected about the user 101 and used by the account management system 130.

In an example embodiment, the user 101 may create the account management system 130 account at any time prior to or while enabling the decryption module 129. In an example embodiment, the user 101 accesses the account management system 130 via a website and the network 140. In an example embodiment, the user 101 submits registration information to the account management system 130, including, but not limited to, name, address, phone number, e-mail address, and information for one or more registered financial card accounts, including bank account debit cards, credit cards, a loyalty rewards account card, or other type of account that can be used to make a purchase (for example, card type, card number, expiration date, security code, and billing address). In an example embodiment, the user's account management system 130 account information is saved in the data storage unit 137 and is accessible to the account management module 135. In another example embodiment, the user 101 is not required to log into and/or maintain an account management system 130 account.

In an example embodiment, the account management system 130 account is a digital wallet account maintained by the account management system 130 or a third party system. In another example embodiment, the user 101 may use a smart phone application 125 to register with the account management system 130. In yet another example embodiment, the user 101 accesses the account management system 130 via a smart phone application 125.

From block 223, the method 200 proceeds to block 230 in FIG. 2.

Returning to block 220 in FIG. 2, if the user 101 has an account management system 130 account, the user 101 logs into the account in block 227. In an example embodiment, the user's account management system 130 account information is saved in the user device 120 and the user 101 is automatically signed into the user's account management system 130 account. In another example embodiment, the user 101 is automatically logged into the account management system 130 account using shared login credentials. In yet another example embodiment, the user 101 was previously logged into the account management system 130 account and is not required to login.

In block 230, the user 101 enters financial account information (for example, credit account, debit account, bank account, stored value account, loyalty account, gift account, or other account capable of paying for a purchase) on the authorized user device 120. In an example embodiment, the user 101 accesses an application 125 on the authorized user device 120 and enters the financial account information. In an example embodiment, the user 101 enters the financial account number, expiration date, card verification number, name of the account, name of the user 101, and any additional information required to process a financial transaction.

In block 240, the financial account information entered by the user 101 is encrypted and replicated to all authorized user devices 120. In an example embodiment, the user 101 has previously enabled the decryption module 129 on more than one user device 120 and the financial account information is replicated to each authorized user device 120. In an example embodiment, the account management system 130 aids in the replication of the decrypted financial account information to each authorized user device 120 via the user's 101 account management system 130 account. The method for encrypting financial account information and replicating the encrypted financial account information to all authorized user devices 120 is described in more detail hereinafter with reference to the methods described in FIG. 3.

FIG. 3 is a block flow diagram depicting a method 240 for encrypting financial account information and replicating the encrypted financial account information to all authorized user devices 120, in accordance with certain example embodiments, as referenced in block 240. The method 240 is described with reference to the components illustrated in FIG. 1.

In block 310, the decryption module 129 on the authorized user device 120 receives the financial account information entered by the user 101. In an example embodiment, the financial account information is entered via the application 125 on the user device 120 and transmitted to the decryption module 129.

In block 320, the decryption module on the authorized user device 120 encrypts the financial information using the card verification number. In an example embodiment, the card verification number is a secret or password that is known to the user. In another example embodiment, the card verification number is known only to the user and not saved to the user device 120. In an example embodiment, the card verification number is a card security code (CSC), card verification data (CVD), card verification value (CVV or CVVs), card verification value code (CVVC), card verification code (CVC or CVC2), verification code (V-code or V code), card code verification (CCV), and/or signature panel code (SPC).

In block 330, the authorized user device 120 transmits the encrypted financial account information and the user's account management system 130 account identification to the account management system 130. In an example embodiment, the user's account management system 130 account identification is an account number, user name, or other identifier that corresponds to the user's account management system 130 account. In an example embodiment, the account identifier allows the account management system 130 to identify the user's 101 account without human intervention. In another example embodiment, the user 101 does not have an account management system 130 account and the authorized user device 120 transmits a guest user account identifier with the encrypted user's financial account information. In an example embodiment, the encrypted financial account information is not saved by the account management system 130. In an example embodiment, the decryption module 129 transmits the encrypted financial account information to the application 125 and the application 125 transmits the information to the account management system 130.

In block 340, the account management system 130 receives the encrypted financial account information and the user's account management system 130 account identifier.

In block 350, the account management system 130 identifies the user account. In an example embodiment, the account management system 130 uses the account identifier to determine which user 101 account corresponds to the account identifier. In another example embodiment, the account management system 130 identifies that the user 101 does not have an account management system 130 account and identifies a guest user account.

In block 360, the account management system 130 saves the encrypted financial information in the user account. In an example embodiment, the encrypted financial account information is saved for the purpose of replicating the encrypted financial account information on each authorized user device 120. In this embodiment, the encrypted financial account information is removed from the account once the information is successfully replicated or once a defined period of time has expired. In another example embodiment, the encrypted financial account information is saved in the user's account management system 130 account until the user 101 requests that the information is removed or the user 101 closes the account. In this embodiment, the encrypted financial account information is replicated to any newly authorized user devices 120. In an example embodiment, the account management system 130 is unable to decrypt or otherwise determine the decrypted financial account information.

In block 370, the account management system 130 transmits the encrypted financial account information to each authorized user device 120. In an example embodiment, each authorized user device 120 is identifiable by the account management system 130 once the decryption module 129 is enabled or once the application 125 is downloaded or otherwise enabled. In an example embodiment, the authorized user devices 120 are associated with the user's account management system 130 account once the user 101 logs into the account on the authorized user device 120.

In block 380, the authorized user devices 120 receive the encrypted financial account information. In an example embodiment, the encrypted financial account information is received by the application 125.

In block 390, the authorized user devices 120 save the encrypted financial account information. In an example embodiment, the encrypted financial account information is saved in the data storage unit 127. In an example embodiment, the authorized user device 120 in unable to decrypt the encrypted financial account information without the user's 101 password or card verification number.

The method 240 then proceeds to block 250 in FIG. 2.

Returning to FIG. 2, in block 250, the user 101 request processing of a financial transaction with the previously encrypted financial information. The method for requesting processing of a financial transaction with previously encrypted financial account information is described in more detail hereinafter with reference to the methods described in FIG. 4.

Figure 4:
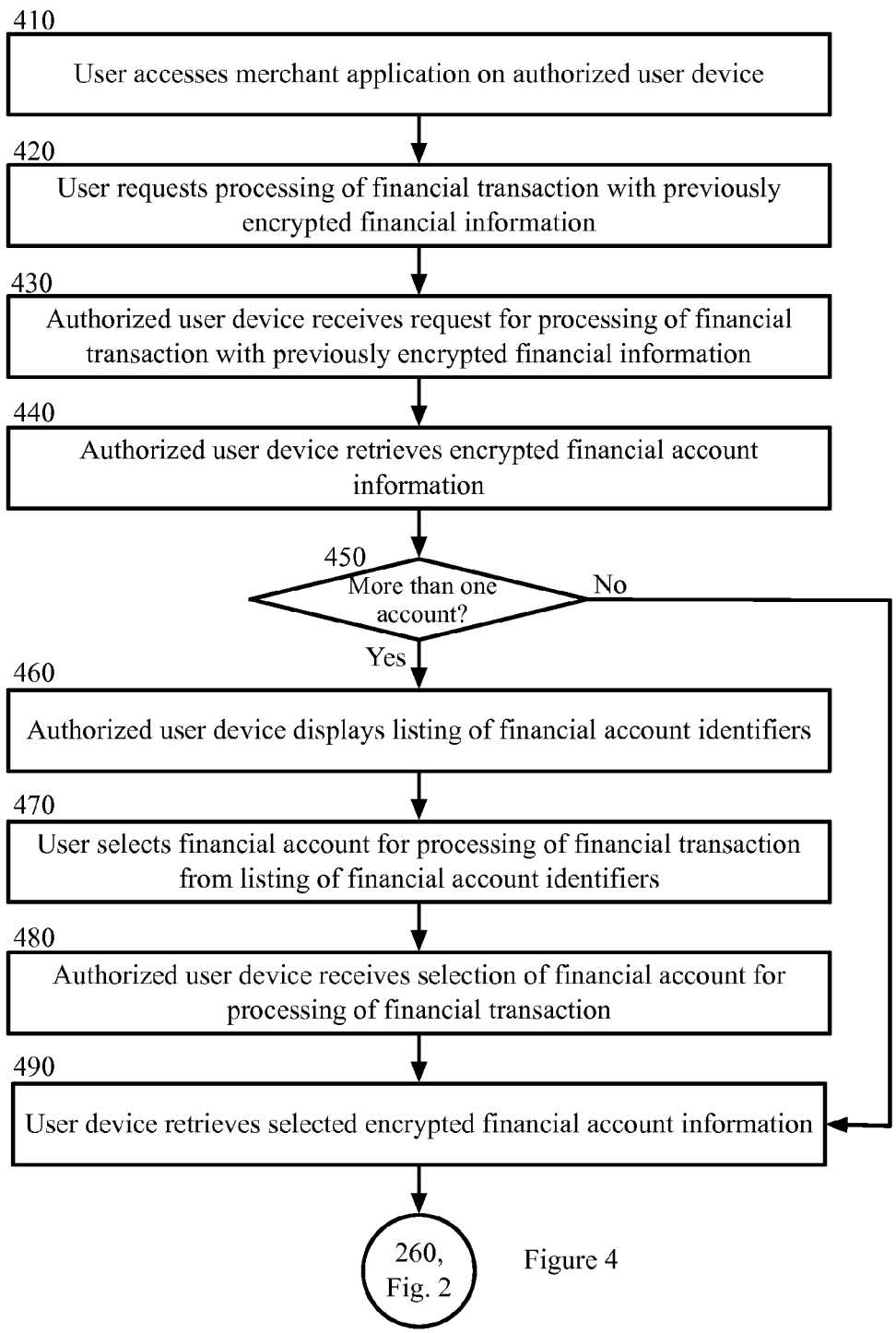
FIG. 4 is a block flow diagram depicting a method for requesting processing of a financial transaction with previously encrypted financial account information, in accordance with certain example embodiments.

FIG. 4 is a block flow diagram depicting a method 250 for requesting processing of a financial transaction with previously encrypted financial account information, in accordance with certain example embodiments, as referenced in block 250. The method 250 is described with reference to the components illustrated in FIG. 1.

In block 410, the user 101 accesses an application 125 on the user device 120. In an example embodiment, the application 125 is a merchant shopping application 125 or other application/website that enables the user 101 to perform an electronic financial transaction. In another example embodiment, the user 101 accesses a payment processing application 125 that enables the user 101 to wirelessly transmit financial account information to a point of sale reader. In this embodiment, the financial account information is transmitted via a secure communication channel (for example, near field communications, Bluetooth, Wi-Fi, or other form of wireless communication channel).

In block 420, the user 101 request processing of the financial transaction with the previously encrypted financial account information. In an example embodiment, the user 101 presses a "checkout" button on an electronic shopping cart or otherwise indicates a desire to complete the financial transaction. In an example embodiment, the user 101 is not required to enter a financial account identifier to indicate a desire to process the financial transaction with the previously encrypted financial information. In another example embodiment, the user 101 selects a button (for example, a "pay with digital wallet" button) or otherwise indicates a desire to use the previously encrypted financial account information.

In block 430 the authorized user device 120 receives the request for processing of the financial transaction with the previously encrypted financial information. In an example embodiment, the application 125 receives the user's 101 request when a button or link is selected.

In block 440, the authorized user device 120 retrieves the encrypted financial account information. In an example embodiment, the application 125 communicates the request to process the financial transaction to the data storage unit 127 and the encrypted financial account information is retrieved.

In block 450, the authorized user device 120 determines whether the user 101 has more than one encrypted financial account. In an example embodiment, user 101 provided a financial account identifier for each financial account and the application 125 retrieves each of the financial account identifiers from the data storage unit 127 to determine whether the user 101 has more than one encrypted financial account.

If the user 101 only one encrypted financial account, the method 250 proceeds to block 490 in FIG. 4.

Returning to block 450, if the user has more than one encrypted financial account, the method 250 proceeds to block 460 in FIG. 4.

In block 460 the authorized user device 120 displays a listing of the financial account identifiers. In an example embodiment, the application 125 displays a list of the financial account identifiers retrieved from the data storage unit 127. In an example embodiment, the financial account identifiers comprise an account nickname, the last for numbers of the decrypted financial account number, or some other form of identifier recognizable by the user 101 as corresponding to the financial account.

In block 470, the user 101 selects a financial account for processing of the financial transaction. In an example embodiment, the user 101 selects the financial account by selecting the financial account identifier displayed by the application 125.

In block 480, the authorized user device 120 receives the selection of the financial account identifier for processing of the financial transaction. In an example embodiment, the application 125 receives the user's 101 selection from the list of financial account identifiers.

In block 490, the authorized user device 120 retrieves the selected encrypted financial account information. In an example embodiment, the user 101 has only one encrypted financial account, and the authorized user device 120 retrieve the information from the data storage unit 127. In another example embodiment, the user 101 has more than one encrypted financial account, and the authorized user device 120 retrieves the information that corresponds to the financial account identifier selected by the user 101.

The method 250 then proceeds to block 260 in FIG. 2.

Returning to FIG. 2, in block 260, the authorized user device 120 displays a request for the card verification number that corresponds to the selected encrypted financial account. In an example embodiment, the card verification number is the same number that was used to encrypt the financial account information before it was replicated to each authorized user device 120. In an example embodiment, the user 101 is required to enter a number to proceed with the financial transaction. In this embodiment, the authorized user device 120 cannot confirm whether the number entered is the correct card verification number, since the card verification number is not known to the authorized user device 120. In this embodiment, the authorized user device 120 can only confirm that a number was entered and that the resulting decrypted financial account information will pass a Luhn test.

In block 270, the users enters the card verification number that corresponds to the selected financial account. In an example embodiment, the user 101 enters the number in the application 125, and the application 125 transmits the card verification number and the decrypted financial account information to the decryption module 129. In another example embodiment, the application 125 transmits the card verification number and the financial account identifier to the decryption module 129.

In block 275, the decryption module 129 on the authorized user device 120 receives the card verification number corresponding to the encrypted financial account information. In an example embodiment, the decryption module 129 receives the corresponding financial information or retrieves it from the data storage unit 127 using the financial account identifier received from the application 125.

In block 280, the decryption module 129 decrypts the financial account information. In an example embodiment, the decryption module 129 uses the card verification number entered by the user 101 to decrypt the financial account information. In an example embodiment, the decryption module 129 is unable to determine whether the card verification number was correctly entered by the user 101. In this embodiment, the decryption module 129 is only able to determine that the decrypted financial account information resembles information for a real financial account and will otherwise pass a Luhn test.

In block 285, the decryption module 129 transmits the decrypted financial account information to the application 125 for processing the financial transaction. In an example embodiment, the decrypted financial account information resembles real financial account information.

In block 290, the application 125 receives the decrypted financial account information. In an example embodiment, the application 125 receives the corresponding card verification number entered by the user 101.

In block 295, the application 125 processes the financial transaction with the decrypted financial account information. In an example embodiment, the application 125 transmits the decrypted financial account information to a merchant system 110 to complete the financial transaction. In this embodiment, the decrypted financial information is transmitted via a secure communication channel to a point of sale reader, transmitted via a payment processing communication channel, or otherwise provided to the merchant system 110 for processing of the transaction. In an example embodiment, the merchant system 110 is unable to determine whether the financial account information was correctly decrypted. In this embodiment, the merchant system 110 passes the decrypted financial account information to a payment processing system that maintains the financial account and receives a notice of an approved or declined payment transaction. In an example embodiment, the payment processing system is able to determine whether the financial account information was correctly decrypted.

Other Example Embodiments

Figure 5:
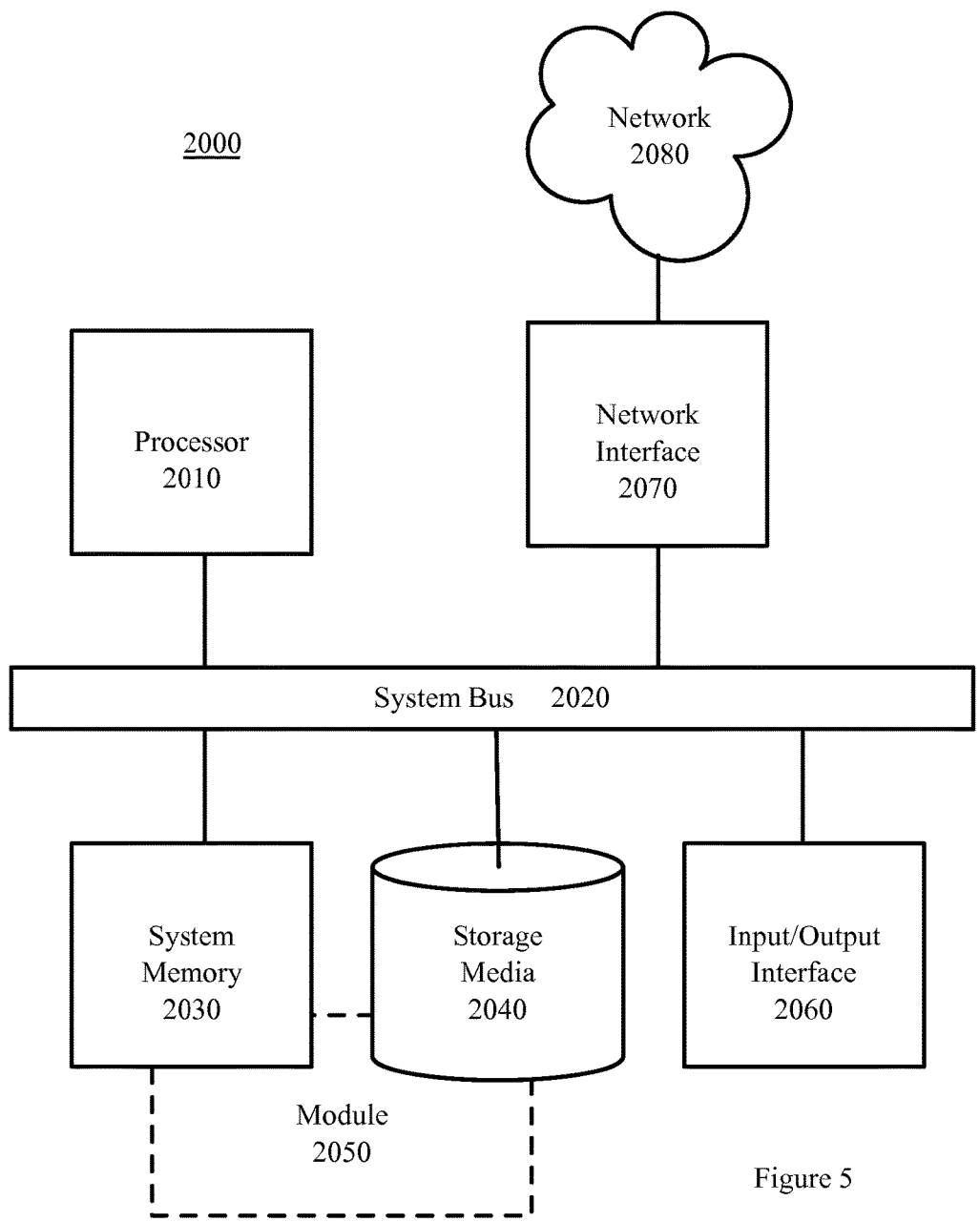
FIG. 5 is a block diagram depicting a computer machine and module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to encrypt and decrypt financial account numbers, comprising:
    receiving, by a computing device operated by a user, financial account information input by the user, the financial account information comprising a financial account number and an account verification number, wherein the account verification number comprises a secret known only to the user and is not stored on the computing device operated by the user;
    encrypting, by the computing device operated by the user, the financial account number using the account verification number input by the user to enable storage of an encrypted financial account number by the computing device operated by the user;
    saving, by the computing device operated by the user, the encrypted financial account number, wherein the saved encrypted financial account number does not comprise the user-provided account verification number;
    transmitting, by the one or more computing devices operated by an account management system, the encrypted financial account number to one or more authorized computing devices operated by the user, wherein the encrypted financial account number is saved by the one or more authorized computing devices operated by the user;
    receiving, by the computing device operated by the user, a request to process a financial transaction;
    in response to receiving the request to process the financial transaction, retrieving, by the computing device operated by the user, the saved encrypted financial account number;
    displaying, by the computing device operated by the user, a request on a user interface of the computing device operated by the user that prompts the user to re-enter the account verification number that was used to encrypt the financial account number to decrypt the saved encrypted financial account number;
    in response to the user re-entering the account verification number, decrypting, by the computing device operated by the user, the retrieved encrypted financial account number using the account verification number input by the user;
    confirming, by the computing device operated by the user, that the decrypted financial account number will pass a Luhn test, the computer device operated by the user being unable to confirm whether the account verification number entered by the user is accurate and results in a valid financial account number; and
    transmitting, by the computing device operated by the user, the decrypted financial account number to process the financial transaction.

2. The method of claim 1, further comprising transmitting, by the computing device operated by the user, the encrypted financial account number to one or more computing devices operated by an account management system that maintains an account for the user, wherein the encrypted financial account number is saved in the user account maintained by the account management system.

3. The method of claim 1, wherein the financial account number comprises one of a debit card, credit card, gift card, and stored value card number.

4. The method of claim 1, wherein the account verification number comprises one of a card security code (CSC), card verification data (CVD), card verification value (CVV or CVVs), card verification value code (CVVC), card verification code (CVC or CVC2), verification code (V-code or V code), card code verification (CCV), and signature panel code (SPC).

5. The method of claim 1, wherein the decrypted financial account number transmitted to process the financial transaction comprises the financial account number received by the computing device operated by the user, and further comprising:
   submitting, by a merchant computing device, a payment request to complete the financial transaction, the payment request comprising the decrypted financial account number; and
   receiving, by the merchant computing device, a payment authorization.

6. The method of claim 1, wherein the decrypted financial account number transmitted to process the financial transaction comprises an invalid financial account number, and further comprising:
   submitting, by a merchant computing device, a payment request to complete the financial transaction, the payment request comprising the decrypted financial account number; and
   receiving, by the merchant computing device, a payment declination.

7. A computer program product, comprising:
   a non-transitory computer-readable medium having computer-executable program instructions embodied therein that when executed by a computer cause the computer to encrypt and decrypt financial account numbers, the computer-executable program instructions comprising:
      computer-executable program instructions to encrypt a financial account number using an account verification number input by a user to enable storage of an encrypted financial account number, wherein the account verification number comprises a secret known only to the user and is not stored on a computing device operated by the user;
      computer-executable program instructions to transmit the encrypted financial account number to one or more authorized computing devices operated by the user, wherein the encrypted financial account number is saved by the one or more authorized computing devices operated by the user;
      computer-executable program instructions to save the encrypted financial account number, wherein the saved encrypted financial account number does not comprise the user-provided account verification number;
      computer-executable program instructions to receive a request to process a financial transaction;
      computer-executable program instructions to retrieve the saved encrypted financial account number;
      computer-executable program instructions to display a request that prompts the user to enter the account verification number known only to the user that was used to encrypt the financial account number to decrypt the saved encrypted financial account number, wherein the account verification number comprises a secret known to a user;
      computer-executable program instructions to decrypt the retrieved encrypted financial account number using the account verification number entered by the user;
      computer-executable program instructions to confirm if the decrypted financial account number is capable of passing a Luhn test, but unable to confirm whether the account verification number entered by the user is accurate and results in a valid financial account number; and
      computer-executable program instructions to transmit the decrypted financial account number to process the financial transaction.

8. The computer program product of claim 7, wherein the financial account number comprises one of a debit card, credit card, gift card, and stored value card number.

9. The computer program product of claim 7, wherein the account verification number comprises one of a card security code (CSC), card verification data (CVD), card verification value (CVV or CVVs), card verification value code (CVVC), card verification code (CVC or CVC2), verification code (V-code or V code), card code verification (CCV), and signature panel code (SPC).

10. The computer program product of claim 7, wherein the decrypted financial account number transmitted to process the financial transaction comprises a financial account number entered by the user, and wherein a payment request submitted to complete the financial transaction is authorized, the payment request comprising the transmitted decrypted financial account number.

11. The computer program product of claim 7, wherein the decrypted financial account number transmitted to process the financial transaction comprises an invalid financial account number, and wherein a payment request submitted to complete the financial transaction is not authorized, the payment request comprising the transmitted decrypted financial account number.

12. A system to encrypt and decrypt financial account numbers, the system comprising:
   a storage medium; and
   a processor communicatively coupled to the storage medium, wherein the processor executes application code instructions that are stored in the storage medium to cause the system to:
      encrypt a financial account number using an account verification number input by a user to enable storage of an encrypted financial account number, wherein the account verification number comprises a secret known only to the user and is not stored on a computing device operated by the user;
      transmit the encrypted financial account number to one or more authorized computing devices operated by the user, wherein the encrypted financial account number is saved by the one or more authorized computing devices operated by the user;
      save the encrypted financial account number, wherein the saved encrypted financial account number does not comprise the user-provided account verification number;
      receive a request to process a financial transaction;
      retrieve the saved encrypted financial account number;
      display a request that prompts the user to enter the account verification number known only to the user that was used to encrypt the financial account number to decrypt the saved encrypted financial account number, wherein the account verification number comprises a secret known only to a user and is not stored on a computing device operated by the user;
      decrypt the retrieved encrypted financial account number using the account verification number entered by the user;
      confirm if the decrypted financial account number is capable of passing a Luhn test; and transmit the decrypted financial account number to process the financial transaction.

13. The system of claim 11, wherein the financial account number comprises one of a debit card, credit card, gift card, and stored value card number.

14. The system of claim 11, wherein the account verification number comprises one of a card security code (CSC), card verification data (CVD), card verification value (CVV or CVVs), card verification value code (CVVC), card verification code (CVC or CVC2), verification code (V-code or V code), card code verification (CCV), and signature panel code (SPC).

15. The system of claim 11, wherein the decrypted financial account number transmitted to process the financial transaction comprises a financial account number entered by the user, and wherein a payment request submitted to complete the financial transaction is authorized, the payment request comprising the transmitted decrypted financial account number.

16. The system of claim 11, wherein the decrypted financial account number transmitted to process the financial transaction comprises an invalid financial account number, and wherein a payment request submitted to complete the financial transaction is not authorized, the payment request comprising the transmitted decrypted financial account number.

\* \* \* \* \*